(12) United States Patent
Zhang et al.

(10) Patent No.: US 10,927,869 B2
(45) Date of Patent: Feb. 23, 2021

(54) WELDING METHODS AND WELDED JOINTS FOR JOINING HIGH-STRENGTH ALUMINUM ALLOYS

(71) Applicant: Ohio State Innovation Foundation, Columbus, OH (US)

(72) Inventors: Wei Zhang, Dublin, OH (US); Tyler Borchers, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 1074 days.

(21) Appl. No.: 15/341,179

(22) Filed: Nov. 2, 2016

(65) Prior Publication Data

US 2017/0130752 A1  May 11, 2017

Related U.S. Application Data

(60) Provisional application No. 62/251,427, filed on Nov. 5, 2015.

(51) Int. Cl.
*F16B 5/08*  (2006.01)
*B23K 9/235*  (2006.01)
(Continued)

(52) U.S. Cl.
CPC ............... *F16B 5/08* (2013.01); *B23K 9/02* (2013.01); *B23K 9/0286* (2013.01); *B23K 9/167* (2013.01); *B23K 9/173* (2013.01); *B23K 9/23* (2013.01); *B23K 9/235* (2013.01); *B23K 20/128* (2013.01); *B23K 20/1265* (2013.01); *B23K 26/211* (2015.10); *B23K 26/282* (2015.10); *B23K 26/32* (2013.01); *B23K 28/02* (2013.01); *B23K 35/286* (2013.01); *B23K 2101/06* (2018.08); *B23K 2103/10* (2018.08)

(58) Field of Classification Search
CPC .................................. F16B 5/08; B23K 9/235
USPC ......................................................... 148/535
See application file for complete search history.

(56) References Cited

U.S. PATENT DOCUMENTS 4,049,186 A    9/1977  Hanneman et al.
4,880,709 A *  11/1989  Holroyd ............... B23K 35/002
                                                            428/654

(Continued)

OTHER PUBLICATIONS

Borchers, T.E. et al., Effect of filler metal and post-weld friction stir processing on stress corrosion cracking susceptibility of Al—Zn—Mg arc welds, Science and Technology of Welding and Joining (Dec. 2014).

(Continued)

*Primary Examiner* — Weiping Zhu
(74) *Attorney, Agent, or Firm* — Meunier Carlin & Curfman LLC

(57) ABSTRACT

Welding methods and welded joints for improving corrosion resistance of the joint between a plurality of high-strength aluminum alloy structural members are described herein. An example method can include applying a first weld at a junction between the plurality of high-strength aluminum alloy structural members using a first filler metal, and applying a second weld on at least a portion of a toe of the first weld using a second filler metal. The second weld can be applied using a fusion welding process (e.g., an arc welding process or a high energy beam welding process). Additionally, the secondary weld can alter a secondary phase of the first weld.

22 Claims, 7 Drawing Sheets

(51) Int. Cl.
  *B23K 9/173*   (2006.01)
  *B23K 9/167*   (2006.01)
  *B23K 28/02*   (2014.01)
  *B23K 9/028*   (2006.01)
  *B23K 26/282*  (2014.01)
  *B23K 26/211*  (2014.01)
  *B23K 9/02*    (2006.01)
  *B23K 9/23*    (2006.01)
  *B23K 20/12*   (2006.01)
  *B23K 26/32*   (2014.01)
  *B23K 35/28*   (2006.01)
  *B23K 103/10*  (2006.01)
  *B23K 101/06*  (2006.01)

(56) References Cited

U.S. PATENT DOCUMENTS

| | | |
|---|---|---|
| 5,233,149 A | 8/1993 | Killian et al. |
| 6,336,583 B1 | 1/2002 | Wang et al. |
| 2010/0006545 A1 | 1/2010 | Macia et al. |

OTHER PUBLICATIONS

Borchers, T.E. et al., Macroscopic Segregation and Stress Corrosion Cracking in 7xxx Series Aluminum Alloy Arc Welds, Metallurgical and Materials Transactions A (Feb. 2015).
Li, W.Y., et al., Effect of cold sprayed Al coating on mechanical property and corrosion behavior of friction stir welded AA2024-T351 joint, Materials and Design vol. 65, pp. 757-761, (Jan. 2015).
Lumsden, J.B. et al., Corrosion Behavior of Friction Stir Welded High Strength Aluminum Alloys (2002).

* cited by examiner

```
┌─────────────────────────────────────────────────────────────────────┐
│ APPLY A FIRST WELD AT A JUNCTION BETWEEN A PLURALITY OF HIGH-STRENGTH│
│    ALUMINUM ALLOY STRUCTURAL MEMBERS USING A FIRST FILLER METAL     │
│                               502                                    │
└─────────────────────────────────────────────────────────────────────┘
                                   │
                                   ▼
┌─────────────────────────────────────────────────────────────────────┐
│     APPLY A SECOND WELD ON AT LEAST A PORTION OF A TOE OF THE FIRST WELD │
│                     USING A SECOND FILLER METAL                      │
│                               504                                    │
└─────────────────────────────────────────────────────────────────────┘
```

FIG. 5

WELDING METHODS AND WELDED JOINTS FOR JOINING HIGH-STRENGTH ALUMINUM ALLOYS

CROSS-REFERENCE TO RELATED APPLICATIONS

This application claims the benefit of U.S. Provisional Patent Application No. 62/251,427, filed on Nov. 5, 2015, entitled "WELDING METHODS AND WELDED JOINTS FOR JOINING HIGH-STRENGTH ALUMINUM ALLOYS," the disclosure of which is expressly incorporated herein by reference in its entirety.

STATEMENT REGARDING FEDERALLY FUNDED RESEARCH

This invention was made with government support under grant number 1034729 awarded by the National Science Foundation. The government has certain rights in the invention.

BACKGROUND

Aluminum alloys (AAs) possess an excellent combination of high strength and low density and are thus widely used for light-weighting applications. For instance, some modern pickup trucks use 6xxx series alloys (sometimes called high-strength, military-grade AAs), which reduces weight by as much as 700 pounds as compared to predecessor models using high-strength steel frames. Advanced high-strength AAs, such as 7xxx series alloys, can be 80% stronger than 6xxx series alloys and are well known for their applications in weight-sensitive aerospace structures. Competing favorably with other structural materials such as advanced high-strength steels and magnesium alloys, 7xxx series alloys can offer significant opportunity for further weight reduction in the next generation of light-weight structures.

Fusion welding, including various arc welding and high energy beam (e.g., laser beam) welding processes, is an important process for joining AAs. Currently, a major technical barrier for the wide-spread implementation of 7xxx series alloys for light-weighting structure applications is the susceptibility to environmental degradation of the welded joints. For example, studies have shown that stress corrosion cracking (SCC), a severe form of environmental degradation, occurs on the gas metal arc welds of AA 7003 during environmental testing in conditions relevant to ground vehicle service. The occurrence of cracking due to environmental exposure poses a severe integrity issue for welded aluminum structures.

One method for mitigating SCC in 7xxx series alloy welds has been developed. The method uses friction stir processing (FSP) to process the weld toe after the gas metal arc welding is completed. Corrosion testing results have shown a significant improvement to SCC after FSP. However, a broad implementation of FSP, for example in mass production automotive assembly lines, is likely to be challenging for a number of reasons. First, FSP machines constitute a large capital investment for many original equipment manufacturers and their suppliers. Second, FSP is a double-sided process and is therefore less flexible and not amenable to corners and/or other complex profiles that are common to vehicle structures. In other words, access to the back side of the base metal is often needed to provide sufficient backing support for the high forging force that is exerted to the weld during FSP. Accordingly, special fixtures would have to be custom designed and made for different weld configurations. Finally, FSP can be relatively slow (i.e., a less productive process).

SUMMARY

High-strength aluminum alloys (e.g., 7xxx series alloys, 2xxx series alloys) are increasingly used for light-weighting in automotive and aerospace structure applications. For example, light-weight structures are essential to next generation energy-efficient transportation systems. However, widespread deployment of such alloys is not often feasible due to the environmental degradation of welded joints. One type of environmental degradation of particular concern is SCC. Thus, welding methods and welded joints that drastically increase a weld's resistance to environmental degradation are described herein. The welding methods and welded joints metallurgically clad a material (e.g., a primary weld) that needs local resistance to environmental degradation. In addition, the welding methods described herein are cost effective.

An example method for improving corrosion resistance of a welded joint between a plurality of high-strength aluminum alloy structural members is described herein. The method can include applying a first weld at a junction between the plurality of high-strength aluminum alloy structural members using a first filler metal, and applying a second weld on at least a portion of a toe of the first weld using a second filler metal. The second weld can be applied using a fusion welding process (e.g., an arc welding process or a high energy beam welding process). Additionally, the secondary weld can alter a secondary phase of the first weld.

An example welded joint is also described herein. The welded joint can include a plurality of high-strength aluminum alloy structural members, a first weld deposited at a junction between the plurality of high-strength aluminum alloy structural members, and a second weld deposited on at least a portion of a toe of the first weld. The first weld can be formed from a first filler metal, and the first weld can define a toe at an interface between the first weld and at least one of the plurality of high-strength aluminum alloy structural members. The second weld can be formed from a second filler metal, and the second weld can define a toe at an interface between the second weld and the at least one of the plurality of high-strength aluminum alloy structural members. The second weld can be applied using a fusion welding process (e.g., an arc welding process or a high energy beam welding process). Additionally, the secondary weld can alter a secondary phase of the first weld.

The secondary phase in the first weld is expected to be anodic (e.g., a tau (T) or beta (β) phase) to at least one of the high-strength aluminum alloy structural members (e.g., the base metal), which can cause corrosion to occur. By applying the second weld, secondary phase precipitation at the toe of the first weld and/or the second weld is reduced, minimized, eliminated, or otherwise isolated from a surface of the toe of the first weld and/or the second weld. In some cases, the secondary phase precipitation at the toe of the second weld is non-existent or not present. If anodic secondary phase precipitation is present, even in reduced or minimized amounts, the anodic secondary phase precipitates are not likely to be harmful since the anodic secondary phase precipitates are not exposed to the atmosphere (i.e., the second weld covers the toe of the first weld). Alternatively or additionally, secondary phase precipitation at the toe of the second weld (if present) is cathodic or neutral (i.e., not anodic) to at least one of the high-strength aluminum alloy structural members. In other words, if secondary phase precipitates are present (i.e., existent) in the second weld, the secondary phase precipitates are not anodic to the base metal. For example, the secondary phase in the second weld can be a $Mg_2Si$, which is neutral to the base metal.

Alternatively or additionally, the second weld can optionally be applied after completion of the first weld. Alternatively or additionally, the first weld and the second weld can optionally be applied in tandem. Optionally, the second weld can be applied after the first weld cools below the melting point of the first filler metal.

In some implementations, the method can optionally further include applying a plurality of second welds on at least respective portions of a plurality of toes of the first weld using the second filler metal. In this case, the welded joint can include a plurality of second welds applied on respective portions of a plurality of toes of the first weld.

Alternatively or additionally, the second weld can optionally cover at least a portion of the first weld and at least a portion of one of the plurality of high-strength aluminum alloy structural members. Optionally, the second weld can extend along an entire length of the toe of the first weld.

Alternatively or additionally, in some implementations, the plurality of high-strength aluminum alloy structural members can be an aluminum (Al)-zinc (Zn) alloy or an Al-copper (Cu) alloy. For example, the high-strength aluminum alloy structural members can optionally be a 7003 alloy (wrought) or a 710.0 alloy (cast). This disclosure contemplates that the high-strength aluminum alloy structural members can be other 7xxx (wrought) or 7xx.x (cast) series alloys. Alternatively or additionally, the high-strength aluminum alloy structural members can optionally be a 2219 alloy (wrought) or a 201.0 alloy (cast). This disclosure contemplates that the high-strength aluminum alloy structural members can optionally be other 2xxx (wrought) or 2xx.x (cast) series alloys. Additionally, the Al—Zn alloy or the Al—Cu alloy can have any temper designation including, but not limited to, temper designations—T4, T6, or T76. Optionally, the plurality of high-strength aluminum alloy structural members can be similar metals (e.g., the same alloy). Optionally, the plurality of high-strength aluminum alloy structural members can be dissimilar metals (e.g., different alloys).

Alternatively or additionally, in other implementations, the plurality high-strength aluminum alloy structural members can be an Al-magnesium (Mg) alloy or an Al—Mg-silicon (Si) alloy. This disclosure contemplates that the high-strength aluminum alloy structural members can be any 5xxx (wrought)/5xx.x (cast) series alloy or any 6xxx (wrought)/3xx.x (cast) series alloy. Additionally, the Al—Mg alloy or the Al—Mg—Si alloy can have any temper designation including, but not limited to, temper designations—T4, T6 or H32. Optionally, the plurality of high-strength aluminum alloy structural members can be similar metals (e.g., the same alloy). Optionally, the plurality of high-strength aluminum alloy structural members can be dissimilar metals (e.g., different alloys).

Alternatively or additionally, the first filler metal can be an Al—Mg alloy or an Al—Cu alloy. For example, the first filler metal can optionally be a 5183, 5356, 5554, 5556, or 5654 alloy. This disclosure contemplates that the first filler metal can be other 5xxx series alloys. Alternatively, the first filler metal can optionally be a 2319 alloy. Although the commercially available 2xxx series filler metal is mostly limited to the 2319 alloy, this disclosure contemplates that other 2xxx series alloy filler wires can be created and used for the first weld.

Alternatively or additionally, the second filler metal can be an Al—Si alloy, a commercially pure Al alloy, or an Al-manganese (Mn) alloy. For example, the second filler metal can optionally be a 4043 or 4943 alloy. This disclosure contemplates that the second filler metal can be other 4xxx series alloys (e.g., 4047 alloy). Alternatively, the second filler metal can optionally be a 1100 or 1188 alloy. This disclosure contemplates that the second filler metal can optionally be other 1xxx series alloys (e.g., 1070 alloy). Alternatively, the second filler metal can optionally be a 3103 alloy. Although the commercially available 3xxx series filler metal is mostly limited to the 3103 alloy, this disclosure contemplates that other 3xxx series alloy filler wires can be created and used for the second weld.

Alternatively or additionally, the first weld can optionally be applied using a fusion welding process. In other words, the first and/or second welds can be applied using a fusion welding process such as an arc welding process or a high energy beam welding process, for example. Optionally, the arc welding process (e.g., used to apply the first weld and/or the second weld) can be a gas metal arc welding (GMAW) process. Optionally, the high energy beam welding process (e.g., used to apply the first weld and/or the second weld) can be a laser beam welding process. This disclosure contemplates that both welds can be made using other arc welding processes (such as gas tungsten arc welding) and high energy beam welding processes (such as laser beam welding).

Alternatively or additionally, the junction between the plurality of high-strength aluminum alloy structural members can be at least one of a lap joint, a fillet joint, an edge joint, a corner joint, or a butt joint.

Another example method for improving corrosion resistance of a welded joint between a plurality of high-strength aluminum alloy structural members is described herein. The method can include applying a first weld at a junction between the plurality of high-strength aluminum alloy structural members, and applying a second weld on at least a portion of a surface of the first weld using a filler metal. The second weld can be applied using a fusion welding process. In addition, the second weld can be applied over a weld nugget and/or heat-affected zone (HAZ) of the first weld.

In some implementations, the first weld can be applied using a solid-state friction stir welding (FSW) process. Alternatively, in other implementations, the first weld can be applied using a fusion welding process.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 2B is a diagram illustrating a cross-sectional view of the welded joint along dashed line A-A' of FIG. 2A.

FIG. 4A is a diagram illustrating a lap joint between a plurality of structural members (e.g., base metals). Optionally, the top weld toe can be covered by the second weld (not shown). FIG. 4B is a diagram illustrating a fillet joint between a plurality of structural members. FIG. 4C is a diagram illustrating a butt joint between a plurality of structural members. FIG. 4D is a diagram illustrating five basic welding joints (i.e., butt, T, lap, corner, and edge joints).

FIG. 5 is a flow chart illustrating example operations for improving corrosion resistance of a welded joint between a plurality of high-strength aluminum alloy structural members.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for improving the stress corrosion cracking resistance of a welded joint between a plurality of AA 7003 structural members by precision additive dressing (PAD) of the weld toe using AA 4043 filler metal, it will become evident to those skilled in the art that the implementations are not limited thereto, but are applicable for improving the corrosion resistance of a welded joint between a plurality of structural members formed of other high-strength aluminum alloys (e.g., other Al—Zn alloys, Al—Cu alloys). Alternatively or additionally, it will become evident to those skilled in the art that other filler metals (e.g., 1xxx, 3xxx, or other 4xxx series filler metals) can be used for PAD of the weld toe.

Figure 1:
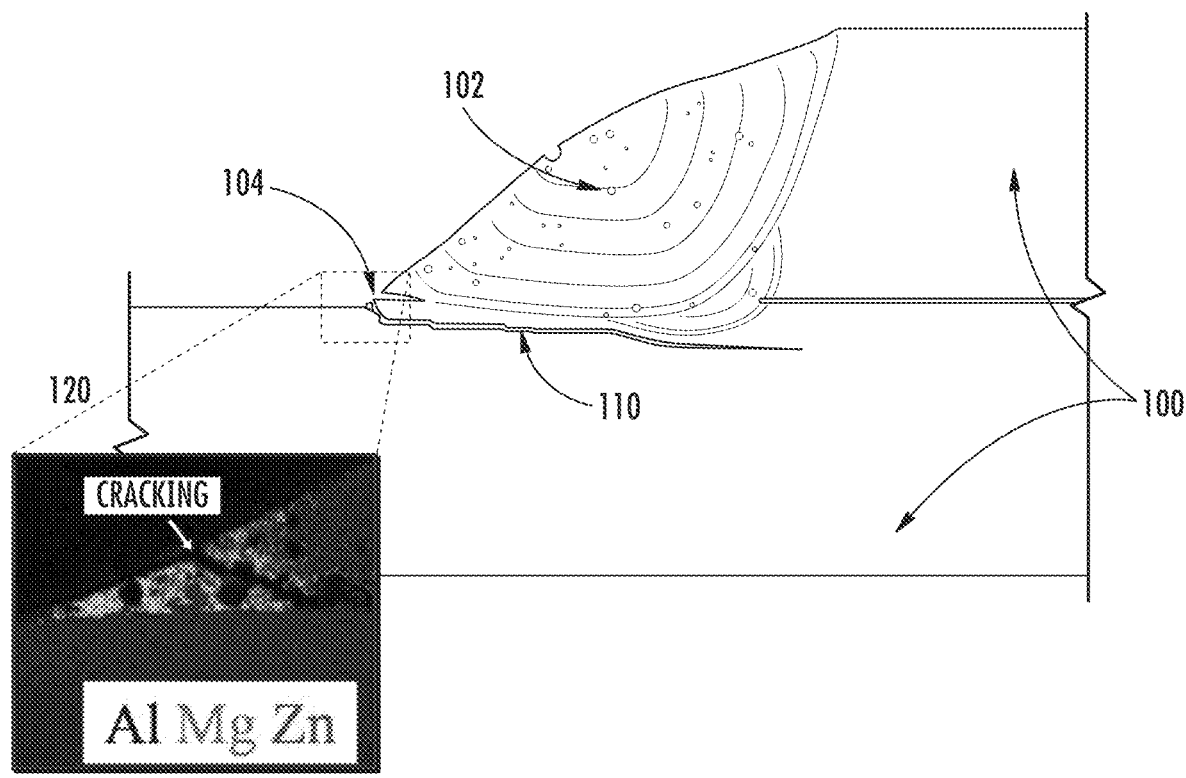
FIG. 1 is a diagram illustrating SCC in gas metal arc welded AA 7003 using AA 5356 filler wire.

Referring now to FIG. 1, a diagram illustrating SCC in gas metal arc welded AA 7003 using AA 5356 filler wire is shown. In FIG. 1, a plurality of AA 7003 (e.g., a high-strength aluminum alloy) structural members 100 are joined by a weld 102. The weld 102 is formed from AA 5356 filler wire, which is an industry-standard filler wire shown to provide adequate strength and avoid metallurgical issues during solidification of AA 7003. The structural members 100 are joined as a lap joint in FIG. 1. However, this disclosure contemplates that other joint structures (e.g., fillet, butt, etc. joints) can be used when joining the structural members. As shown in FIG. 1, when the AA 7003 structural members 100 and the weld 102 were placed under tensile stress in a corrosive environment (e.g., salt water), a crack 110 propagated into one of the structural members (e.g., the lower structural member in FIG. 1). The crack 110 initiates at a toe 104 of the weld 102 and propagates in the HAZ along the fusion line between the weld 102 and the base metal. As used herein, a toe of the weld (also referred to herein as a "weld toe") is defined along a line where to weld meets a surface of a structural member (e.g., the base metal). In FIG. 1, box 120 shows a map of elemental composition at the toe 104 of the weld 102. As described below, Mg is concentrated (or enriched) at the toe 104 of the weld 102, which is where the crack 110 initiates. The Mg is thus segregated with high intensity to a weld toe region. In other words, the relative content of Mg at the toe 104 of the weld 102 is greater than the relative content of Mg in the filler wire. The crack 110 is the result of SCC and poses a severe integrity issue for the welded joint of FIG. 1.

Magnesium-bearing filler metals such as aluminum alloy 5356 have been successfully used to weld high-strength aluminum alloy such as 7xxx series alloys. However, when exposed to a corrosive environment (e.g., salt water), while under tensile stress, these welds have shown susceptibility to SCC, where crack propagation occurs in the heat-affected zone (HAZ). This problem is described in Borchers et al., Macroscopic Segregation and Stress Corrosion Cracking in 7xxx Series Aluminum Alloy Arc Welds, Metallurgical and Materials Transactions A, Vol. 46, Issue 5, pp. 1827-31 (2015) (hereinafter the "Borchers article"). The occurrence of SCC in service could hinder broad usage of welded 7xxx series aluminum alloys for light-weighting structural applications, for example in ground vehicle (e.g., automotive) applications where corrosive environments exist. The weld 102 in FIG. 1 was formed using a fusion welding process. Welds formed using a fusion welding process have been shown to be susceptible to SCC in the HAZ. It should also be understood that welds formed using a friction stir welding (FSW) have been shown to be susceptible to SCC in the HAZ, particularly in the region adjacent to where the weld contacts the structural member.

The SCC phenomenon in aluminum may be governed by two interdependent mechanisms: anodic dissolution/film rupture and hydrogen embrittlement (HE). Anodic dissolution pertains to preferential dissolution of grain boundaries, typically linked to grain boundary precipitates. It results in rupture of surface oxide film and adsorption of hydrogen on the nascent metal at the crack tip. A local embrittled zone is formed at the crack tip due to HE, which in turn, results in crack propagation under tensile stress.

The effect of secondary phases and respective anodic dissolution on SCC has been documented in the literature. A variety of secondary phases exist in the aluminum matrix; many of them have beneficial effects such as increasing the strength via precipitation hardening. On other hand, secondary phases that are anodic to the base metal can negatively affect SCC resistance. These detrimental secondary phases include η ($MgZn_2$), β ($Al_8Mg_5$), and/or T ($Mg_{32}(Al,Zn)_{49}$) phases which are formed depending on the alloy compositions [Bobby-Kannan et al., *Corrosion*, vol. 59, p. 881 (2003); Sprowls et al., *Fundamental Aspects of Stress Corrosion Cracking*, R. W. Staehle, Ed. Houston, United States, National Association of Corrosion Engineers (1969); Carroll et al., 5000 *Series Alloys with Improved Corrosion Properties and Methods for Their Manufacture and Use*, U.S. 2004/0091386].

As shown in FIG. 1, Mg is concentrated in, or segregated to, a region of the toe 104 of the weld 102. This preferential segregation has characteristics of both macro- and micro-segregation. It is macroscopic in the sense that it is confined to the very tip of the weld toe and is absent elsewhere in the weld metal (e.g., as shown in box 120 of FIG. 1). At the same time, the enrichment of Mg at the weld toe region occurs along the face-centered cubic (FCC) grain boundaries and is thus microscopic. The Mg-enriched weld toe region forms large islands of secondary phase (e.g., T phase) precipitates along the FCC grain boundaries. The mechanism for such macroscopic Mg segregation has been attributed to the vaporization of alloying elements (e.g., Mg) from the surfaces of weld pool and droplets and subsequent condensation as a detritus around the weld pool. See T. Borchers, Weldability and Corrosion of 7xxx Series Aluminum Alloys, Doctoral Dissertation, The Ohio State University, 2016.

Additionally, as shown in FIG. 1, SCC initiates in the weld toe region and propagates in the HAZ along the fusion line between the weld and the base metal. The weld toe region contains the secondary phase (e.g., T phase) precipitates, which are anodic to the Al matrix (e.g., the base metal or high-strength aluminum alloy structural members). The T phase is found to play a major role in initiating SCC due to preferential dissolution of T precipitates formed continuously along the grain boundaries.

Figure 2A:
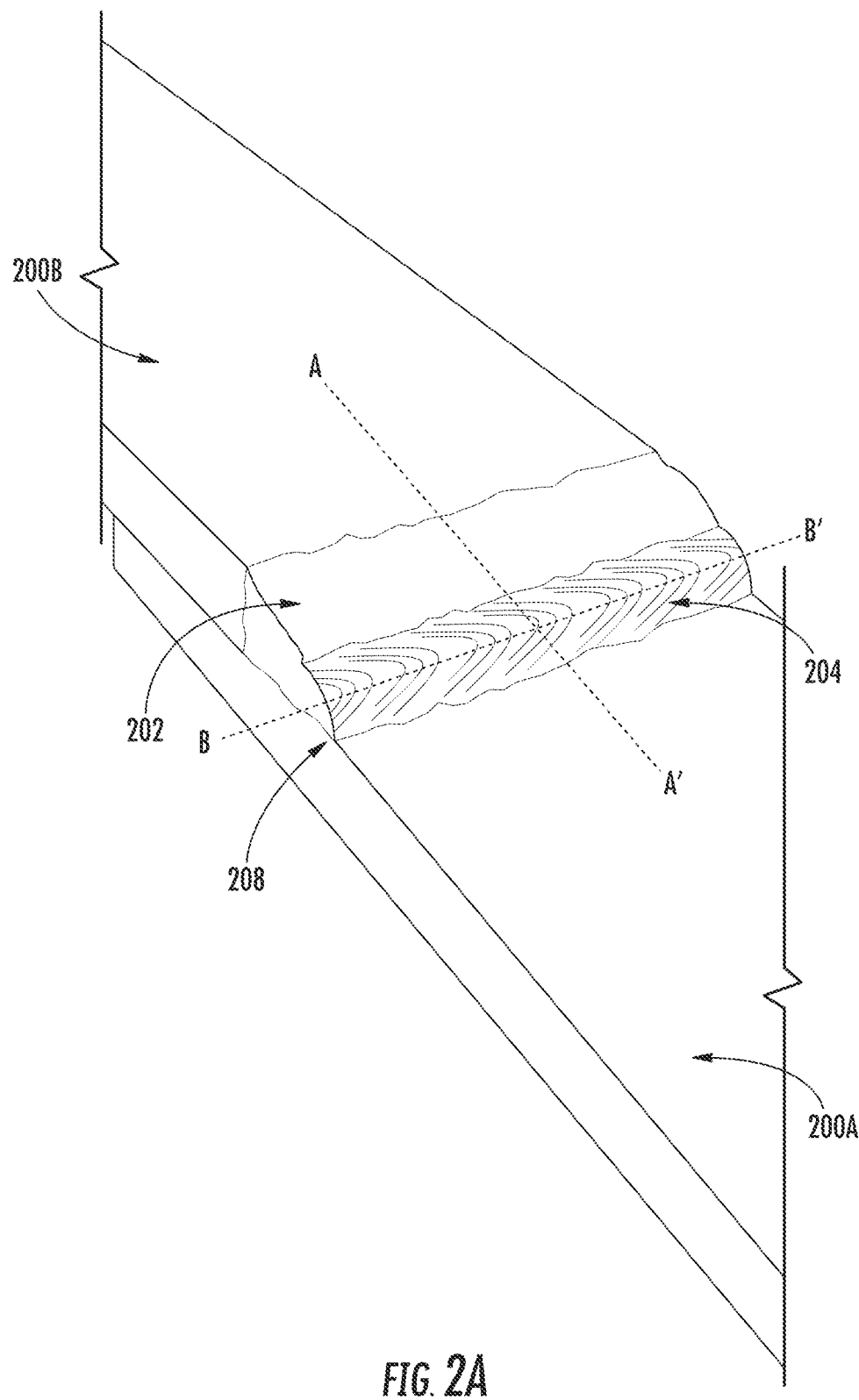
FIGS. 2A-2B are diagrams illustrating a corrosion-resistant welded joint between a plurality of high-strength aluminum alloy structural members according to implementations described herein.
Figure 2B:
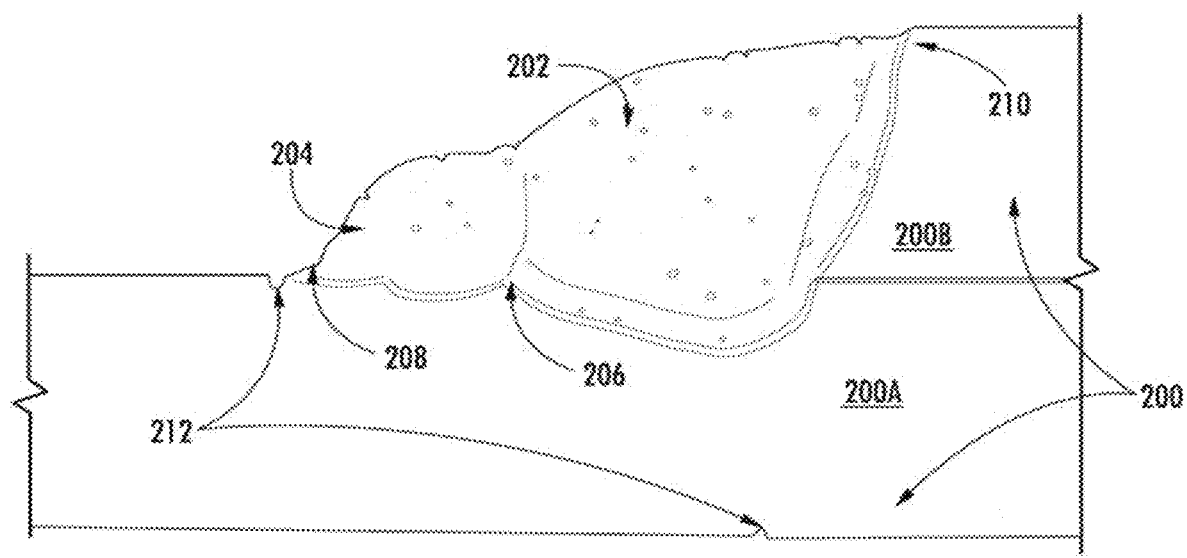

Referring now to FIGS. 2A-2B, diagrams illustrating a corrosion-resistant welded joint between a plurality of high-strength aluminum alloy structural members according to implementations described herein are shown. As shown in FIGS. 2A-2B, the welded joint can include a plurality of high-strength aluminum alloy structural members 200A and 200B (collectively referred to herein as the "plurality of high-strength aluminum alloy structural members 200"). High-strength aluminum alloys are characterized by high strength and low density, which makes them desirable for use in light-weighting structural applications (e.g., automotive, aerospace, etc.). As used herein, Al—Zn alloys and Al—Cu alloys are high-strength aluminum alloys. Both Al—Zn and Al—Cu alloys, however, are known to be susceptible to SCC. In FIGS. 2A-2B, the welded joint is a lap joint (e.g., see also FIG. 4A). It should be understood that the high-strength aluminum alloy structural members can be joined using other joint geometries, including but not limited to, a fillet joint (e.g., see FIG. 4B), a butt joint (e.g., see FIG. 4C), a corner joint (e.g., see FIG. 4D), or an edge joint (e.g., see FIG. 4D). Optionally, in some implementations, the plurality of high-strength aluminum alloy structural members 200 can be similar metals (e.g., each structural member formed from the same alloy). Optionally, in other implementations, the plurality of high-strength aluminum alloy structural members 200 can be dissimilar metals (e.g., each structural member formed from different wrought and/or cast alloys, including different alloys of the same series). Additionally, although two high-strength aluminum alloy structural members are shown as examples in the figures, it should be understood that the welded joint can include more than two (e.g., three, four, etc.) high-strength aluminum alloy structural members.

As described above, in some implementations, the plurality of high-strength aluminum alloy structural members 200 can be an Al—Zn alloy or an Al—Cu alloy. For example, the high-strength aluminum alloy structural members 200 can optionally be AA 7003 (wrought) or AA 710.0 (cast). This disclosure contemplates that the high-strength aluminum alloy structural members 200 can be other 7xxx (wrought) or 7xx.x (cast) series alloys. Alternatively or additionally, the high-strength aluminum alloy structural members 200 can optionally be AA 2219 (wrought) or AA 201.0 (cast). This disclosure contemplates that the high-strength aluminum alloy structural members 200 can optionally be other 2xxx (wrought) or 2xx.x (cast) series alloys. Alternatively or additionally, in some implementations, the plurality high-strength aluminum alloy structural members 200 can be an Al—Mg alloy or an Al—Mg—Si alloy. This disclosure contemplates that the high-strength aluminum alloy structural members 200 can be any 5xxx (wrought)/5xx.x (cast) series alloy or any 6xxx (wrought)/3xx.x (cast) series alloy. Additionally, the high-strength aluminum alloy (s) can have any temper designation including, but not limited to, temper designation—T4, T6, T76, H32. It should be understood that temper designations T4 and T6 are applicable to Al—Zn, Al—Cu, and Al—Mg—Si alloys, temper designation T76 is applicable to Al—Zn and Al—Cu alloys (for the purpose of increasing SCC resistance), and temper designation H32 is applicable to Al—Mg alloys.

Figure 4A:
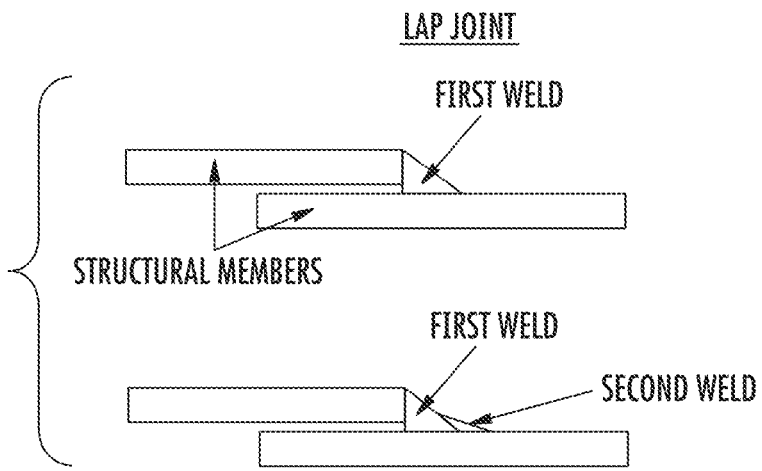
FIGS. 4A-4D are diagrams illustrating various welded joints.
Figure 4B:
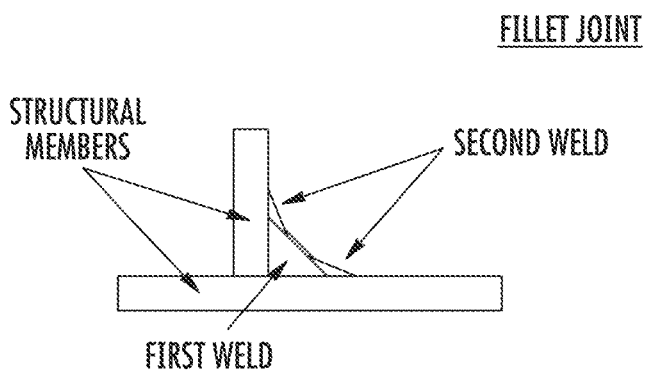
Figure 4C:
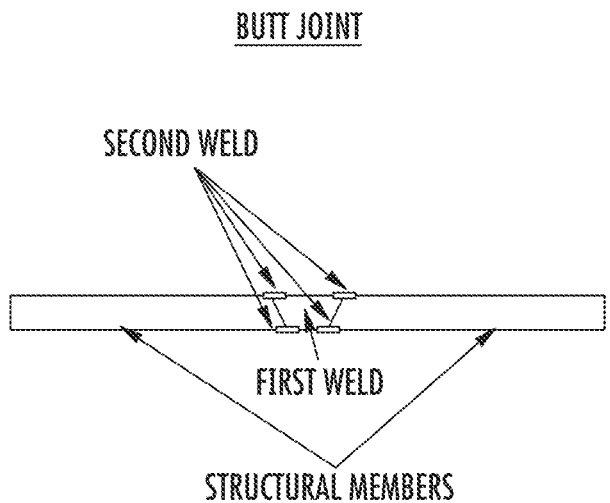
Figure 4D:
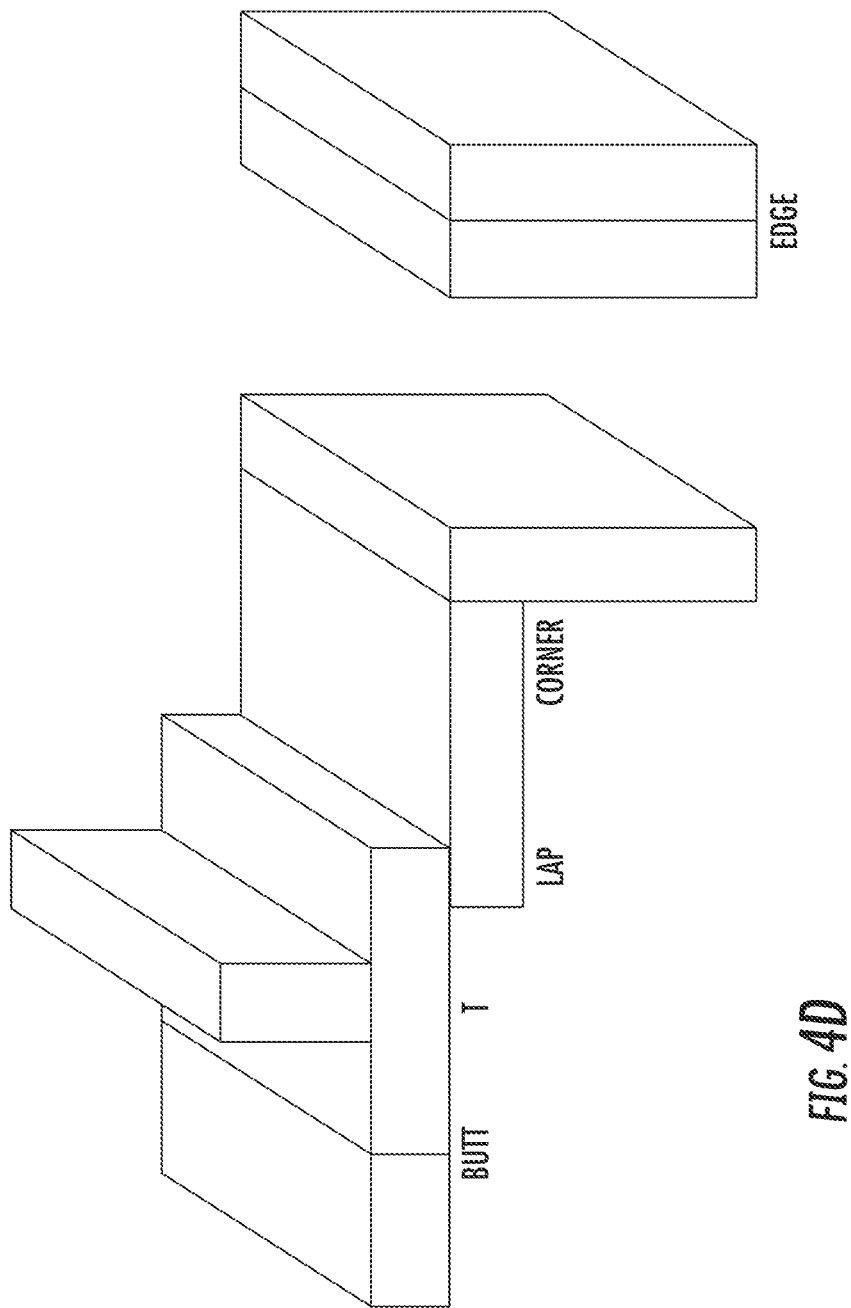

Additionally, as shown in FIGS. 2A-2B, the welded joint can include a first weld 202 deposited at a junction between the plurality of high-strength aluminum alloy structural members 200. When applied, the first weld 202 contacts a portion (e.g., a surface) of each of the high-strength aluminum alloy structural members 200, which joins the plurality of high-strength aluminum alloy structural members 200. The first weld 202 can define a toe at an interface between the first weld 202 and at least one of the plurality of high-strength aluminum alloy structural members 200 (e.g., the lower or bottom structural member 200A in FIGS. 2A-2B). The toe is formed along a line where the first weld 202 meets the surface of structural member 200A, which is shown by dotted line B-B' in FIG. 2B. For comparison, FIGS. 4A-4C show the location of the first weld in a lap joint, a fillet joint, and a butt joint, respectively. Additionally, the first weld 202 can be applied using a fusion welding process (e.g., an arc welding process such as a GMAW process). This disclosure contemplates that the first weld 202 can be applied using other arc or high energy beam welding processes including, but not limited to, gas tungsten arc welding, shielded metal arc welding, or laser welding.

The first weld 202 can be formed from a first filler metal. Selection of suitable filler metals is known in the art. For example, American Welding Society (AWS) publishes an American National Standard entitled "Welding Consumables—Wire Electrodes, Wires and Rods for Welding of Aluminum and Aluminum-Alloys—Classification". In addition, the Hobart Filler Metals Aluminum Filler Metal Selection Chart of HOBART BROTHERS COMPANY of Troy, Ohio provides filler metal selections based on base metals (e.g., structural members). Optionally, the first filler metal can be an Al—Mg alloy or an Al—Cu alloy. For example, the first filler metal can optionally be AA 5356. As described above, AA 5356 is an industry-standard filler wire used for welding high-strength aluminum alloys such as 7xxx (wrought) or 7xx.x (cast) series alloys. Alternatively, the first filler metal can be AA 5556, AA 5183, AA 5554, or AA 5654. This disclosure contemplates that the first filler metal can be other 5xxx series alloys. Alternatively, the first filler metal can optionally be a 2319 alloy. Although the commercially available 2xxx series filler metal is mostly limited to the 2319 alloy, this disclosure contemplates that other 2xxx series alloy filler wires can be created and used for the first filler metal.

Additionally, as shown in FIGS. 2A-2B, the welded joint can include a second weld 204 deposited on at least a portion of a toe of the first weld 202. The second weld 204 can cover at least a portion of the first weld 202 and at least a portion of one of the plurality of high-strength aluminum alloy structural members 200 (e.g., the lower or bottom structural member 200A in FIGS. 2A-2B). The second weld 204 is formed over dotted line B-B' in FIG. 2A and contacts a surface of the first weld 202 and a surface of structural member 200A as shown in FIG. 2B. The second weld 204 covers the toe 206 of the first weld 202 as shown in FIG. 2B. Additionally, the second weld 204 can define a toe at an interface between the second weld 204 and at least one of the plurality of high-strength aluminum alloy structural members 200 (e.g., the lower or bottom structural member 200A in FIGS. 2A-2B). The toe 208 of the second weld 204 is shown in FIG. 2B. Optionally, the second weld 204 can extend along an entire length of the toe of the first weld 202 as shown in FIG. 2A, or the second weld 204 can extend along only a portion of the length of the toe of the first weld 202 (not shown). For comparison, FIGS. 4A-4C show the location of the second weld in a lap joint, a fillet joint, and a butt joint, respectively. Additionally, the second weld 204 can be applied using a fusion welding process (e.g., an arc welding process such as a GMAW process). In an example implementation, the second weld 204 can be welded with the low-dilution, cold metal transfer (CMT) process with Fronius power supply. Additionally, the wire-feed speed and travel speed can optionally be set to 4.6 meter per minute (m/min) and 1.40 m/min, respectively. It should be understood that the parameters of the welding process, including wire-feed and travel speeds, are provided only as examples. This disclosure contemplates that the second weld 204 can be welded with different welding parameters and/or welding equipment. This disclosure also contemplates that the second weld 204 can be applied using other arc or high energy beam welding processes including, but not limited to, gas tungsten arc welding, shielded metal arc welding, or laser welding.

The second weld 204 can be formed from a second filler metal. The second filler metal can be selected such that a secondary phase in the first weld 202 is altered. It should be understood that the secondary phase in a weld depends on the composition of the base and filler wire metals. Additionally, it is possible that detrimental secondary phases (e.g., secondary phases anodic to the base metal such one of the high-strength aluminum alloy structural members 200) may exist in the first weld 202. Thus, by selecting an appropriate material for the second weld 204, secondary phase precipitation at the toe of the first weld 202 and/or the second weld 204 can be reduced, minimized, eliminated, or otherwise isolated from a surface of the first weld 202 and/or the second weld 204. This can improve SCC resistance. In some cases, the secondary phase precipitation at the toe of the second weld 204 is non-existent or not present. If anodic secondary phase precipitation is present in the first weld 202, even in reduced or minimized amounts, the anodic secondary phase precipitates are not likely to be harmful since the anodic secondary phase precipitates are not exposed to the atmosphere (i.e., the second weld 204 covers the toe of the first weld 202). Additionally, the anodic secondary phase precipitation at the toe of the first weld 202 can be reduced, minimized, or eliminated as compared to the amount of anodic secondary phase precipitation expected in the absence of the second weld 204. Alternatively or additionally, secondary phase precipitation at a toe of the second weld 204 (if present or existent) can be cathodic or neutral (i.e., not anodic) to at least one of the high-strength aluminum alloy structural members 200 (e.g., the lower or bottom structural member 200A in FIGS. 2A-2B). This can improve SCC resistance. For example, the material for the second weld 204 can optionally be selected such that the secondary phase in the second weld can be a $Mg_2Si$ phase, which is neutral to the base metal. For example, $Mg_2Si$ would be expected to precipitate in the weld toe (e.g., weld toe 208) of the second weld 204 when the filler wire is an Al—Si alloy. Additionally, in the case where the first weld 202 is welded with Al—Mg filler wire, for example, the Mg would be present due to Mg segregation in the first weld 202 as described above (i.e., the toe of the first weld 202 serves as the "base metal"), and Si would be present in the filler wire used for the second weld 204.

The second filler metal can be an Al—Si alloy, a commercially pure Al alloy, or an Al—Mn alloy. Optionally, the second filler metal can be AA 4043 or AA 4943. This disclosure contemplates that the second filler metal can be other 4xxx series alloys. Alternatively, the second filler metal can optionally be AA 1100 or AA 1188. This disclosure contemplates that the second filler metal can optionally be other 1xxx series alloys. Alternatively, the second filler metal can optionally be AA 3103. Although the commercially available 3xxx series filler metal is limited to the 3103 alloy, this disclosure contemplates that other 3xxx series alloy filler wires can be created and used for the second weld 204. After applying the second weld 204, the secondary phase in a toe region (e.g., at the toe 208) of the second weld 204 is eliminated, or if present, is either cathodic or neutral to structural member 200A (e.g., the base metal).

In the welded joint described in FIGS. 2A-2B, the toe of the first weld 202 (e.g., formed using AA 5356 filler wire) is at least partially covered by the second weld 204 (e.g., formed using AA 4043 filler wire). This process is referred to herein as precision additive dressing (PAD). In other words, the local weld toe region of the first weld 202 is clad by the second weld 204 by a low dilution gas metal arc welding process. The welded joint (e.g., the structural members 200, first weld 202, and second weld 204) was subjected to aggressive corrosion testing. For example, the welded joint was placed under tensile stress while immersed in a corrosive environment (e.g., in chromic acid at 85-100° C. for 6 hours). As shown in FIG. 2B, no crack propagates from near the toe 208 of the second weld 204 into structural member 200A (e.g., along the fusion line of the second weld 204). On the contrary, welded joints without PAD (e.g., AA 7003 welded only with AA 5356 filler wire) failed within minutes after exposure to high-temperature chromic acid. Additionally, as shown in FIG. 2B, a crack 210 initiates from near a toe of the first weld 202 into structural member 200B in a region where a second weld has not been applied. Further, pitting 212 near the toe 208 of the second weld 204 and on a back surface of structural member 200A is shown in FIG. 2B.

In some implementations, the weld (i.e., the first weld described above), which is applied at the junction between the plurality of high-strength aluminum alloy structural members, can be formed using a solid-state friction stir welding (FSW) process. The FSW process can be used to join structural members. For example, with reference to FIG. 4C, the first weld can be applied using an FSW process in order to join the structural members in a butt joint. It should be understood that the structural members can be joined in other configurations including, but not limited to, a lap joint, a fillet joint, an edge joint, or a corner joint. As discussed herein, the first weld formed using an FSW process has been shown to be susceptible to corrosion in the weld nugget and/or HAZ.

A second weld can be applied on at least a portion of a surface of the first weld using a filler metal. For example, the second weld can be applied over one or more surface areas above the weld nugget and/or HAZ of the first weld. In other words, the weld nugget and/or HAZ of the first weld is arranged underneath the second weld. The first weld has been shown to be susceptible to corrosion in the weld nugget and/or HAZ, and application of the second weld in this manner can improve corrosion resistance of the welded joint. This disclosure contemplates that the filler metal used for the second weld can be any one of the second filler metals described above such as AA 4043, for example. Additionally, the second weld can be applied using a fusion welding process as described herein.

In some implementations, a plurality of second welds can be applied on at least respective portions of the one or more surfaces of the first weld. For example, as shown in FIG. 4C, a plurality of second welds can be applied in respective regions where the first weld contacts the structural members. These are regions where the first weld is susceptible to corrosion. Although the above example described with regard to FIG. 4C includes forming the first weld using an FSW process, it should be understood that the first weld can be formed using other welding processes such as a fusion welding process. For example, application of a second weld over the weld nugget and/or HAZ of a first weld, which can be formed using welding processes other than an FSW process, can improve corrosion resistance of the welded joint.

Figure 3:
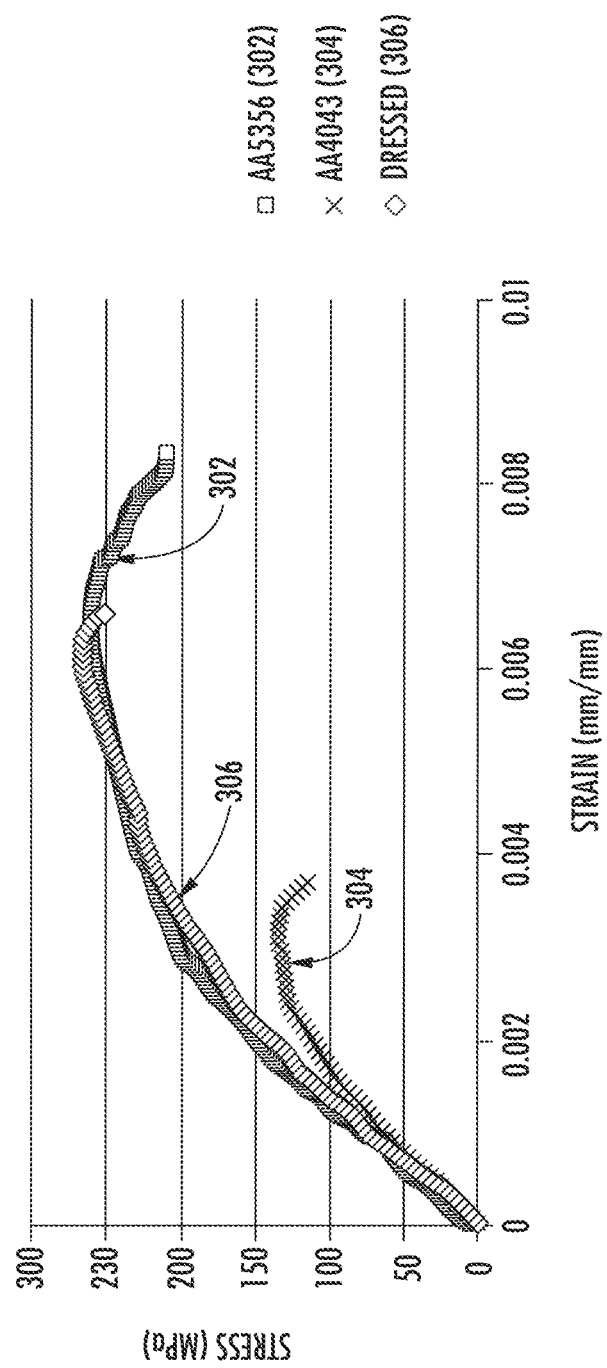
FIG. 3 illustrates example plots of stress-strain curves for three different welds in lap-shear tensile testing.

Referring now to FIG. 3, example plots of stress-strain curves for three different welds in lap-shear testing are shown. Plot 302 illustrates the stress-strain curve for a weld formed from AA 5356 filler wire. As described above, AA 5356 is an industry-standard filler wire used for welding high-strength aluminum alloys. However, AA 5356 filler wire results in a weld joint that is highly susceptible to SCC, a major structural integrity issue, when the high-strength aluminum alloy structural members is exposed to corrosive environments. Plot 304 illustrates the stress-strain curve for a weld formed from AA 4043 filler wire. AA 4043 filler wire is a commonly used filler wire and is also corrosion resistant (unlike AA 5356). But, AA 4043 exhibits low strength that significantly under-matches that of the high-strength aluminum alloys (e.g., 7xxx/7xx.x or 2xxx/2xx.x series alloys). As shown in FIG. 3, the AA 4043 weld (i.e. Plot 304) has a tensile strength of only 130 MPa, which is about 100% lower than the AA 5356 weld (i.e., Plot 302). Due to its low strength, AA 4043 is not a practical option for welding the high-strength aluminum alloy structural members. Plot 306 illustrates the stress-strain curve for a weld (e.g., PAD'd weld) formed from AA 5356 filler wire dressed with AA 4043 filler wire. As shown in FIG. 3, the PAD'd weld has the same strength and ductility as the AA 5356 weld (i.e., Plot 302) while offering superior corrosion resistance.

Accordingly, the welded joint between a plurality of high-strength aluminum alloys (e.g., 7xxx/7xx.x or 2xxx/2xx.x series alloys) described herein combines the advantages of two filler metals. The primary weld (e.g., the first weld) is formed using a filler metal providing required strength. For example, the primary weld can be formed from a 5xxx series filler wire such as AA 5356. The secondary weld (e.g., the PAD'd weld or second weld) is formed using a filler metal providing environmental protection (e.g., corrosion resistance). For example, the secondary weld can be formed from a 4xxx series filler wire such as AA 4043 (or 1xxx or 3xxx series filler wire). Unlike conventional coating or painting, PAD provides a true metallurgical bond that is stable and durable.

Referring now to FIG. 5, example operations for improving corrosion resistance of a welded joint between a plurality of high-strength aluminum alloy structural members is shown. At 502, a first weld is applied at a junction between the plurality of high-strength aluminum alloy structural members using a first filler metal. At 504, a second weld is applied on at least a portion of a toe of the first weld using a second filler metal. The materials selected for the structural members, first weld, and second weld are described in detail above. Additionally, as described above, the second filler metal can be selected such that a secondary phase of the first weld is altered. For example, secondary phase precipitation at the toe of the first weld and/or the second weld can be reduced, minimized, or eliminated. If anodic secondary phase precipitation is present in the first weld, even in reduced or minimized amounts, the anodic secondary phase precipitates are not likely to be harmful since the anodic secondary phase precipitates are not exposed to the atmosphere (i.e., the second weld covers the toe of the first weld). Additionally, the amount of anodic secondary phase precipitation in the first weld would be less than the scenario where the second weld is not applied. Alternatively or additionally, secondary phase precipitation at the toe of the second weld (if present) can be cathodic or neutral (i.e., not anodic) to at least one of the high-strength aluminum alloy structural members (e.g., the base metal). Additionally, the first and second welds can be applied using a fusion welding process (e.g., an arc welding process such as a GMAW process or high energy beam welding process). The second weld can optionally be applied after completion of the first weld. Alternatively or additionally, the first weld and the second weld can optionally be applied in tandem, for example, when two different welding torches are simultaneously used such that a first torch creates the first weld followed by a second torch which creates the second weld. Optionally, the second weld can be applied after the first weld cools below the melting point of the first filler metal.

Optionally, in some implementations, a plurality of second welds can be applied on at least respective portions of a plurality of toes of the first weld using the second filler metal. In this case, the welded joint can include a plurality of second welds applied on respective portions of a plurality of toes of the first weld. This is shown in FIGS. 4B and 4C, where a second weld is formed over a plurality of portions of the first weld.

Potential Applications

Wide-spread implementation of the welding methods and welded joints described herein for light-weighting structural applications (e.g., on an automotive assembly line) is expected to be highly feasibly for the following reasons. First, the example PAD described above is a variation of GMAW (e.g., the process for making the primary weld) with low heat input and dilution. The PAD equipment cost is several orders of magnitude cheaper than an FSP machine. Second, as a single-sided process like GMAW, PAD is flexible and amenable to complex-shaped structures unlike FSP. The same fixture used for primary welding can be used for PAD. Finally, PAD can be faster and thus highly productive as compared to FSP. It can be integrated with the primary GMAW for a tandem process to further increase the productivity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for improving corrosion resistance of a welded joint between a plurality of high-strength aluminum alloy structural members, comprising:

applying a first weld at a junction between the plurality of high-strength aluminum alloy structural members using a first filler metal to join the plurality of high-strength aluminum alloy structural members, wherein the first weld is applied to each of the high-strength aluminum alloy structural members, wherein the first weld contacts respective surfaces of each of the high-strength aluminum alloy structural members, the first weld defining a toe along a line where the first weld meets the respective surface of at least one of the high-strength aluminum alloy structural members; and applying a second weld on at least a portion of the toe of the first weld using a second filler metal, wherein the second weld contacts at least a portion of the respective surface of the at least one of the high-strength aluminum alloy structural members and the portion of the toe of the first weld, wherein the second weld is applied using a fusion welding process, and wherein the second weld alters a secondary phase in the first weld.

2. The method of claim 1, wherein the secondary phase in the first weld is anodic to at least one of the high-strength aluminum alloy structural members.

3. The method of claim 1, wherein secondary phase precipitation at the toe of the first weld is reduced, minimized, eliminated, or isolated from a surface of the first weld, and secondary phase precipitation at a toe of the second weld is non-existent, or if existent, the secondary phase precipitation at the toe of the second weld is cathodic or neutral to at least one of the high-strength aluminum alloy structural members.

4. The method of claim 1, wherein the second weld is applied after completion of the first weld or the first weld and the second weld are applied in tandem.

5. The method of claim 4, wherein the second weld is applied after the first weld cools below a melting point of the first filler metal.

6. The method of claim 1, wherein the second weld extends along an entire length of the toe of the first weld.

7. The method of claim 1, wherein the plurality of high-strength aluminum alloy structural members comprise an aluminum (Al)-zinc (Zn) alloy or an Al-copper (Cu) alloy.

8. The method of claim 7, wherein the plurality of high-strength aluminum alloy structural members are similar metals or dissimilar metals.

9. The method of claim 7, wherein the Al—Zn alloy is a 7003 or 710.0 alloy and the Al—Cu alloy is a 2219 or a 201.0 alloy.

10. The method of claim 1, wherein the plurality of high-strength aluminum alloy structural members comprise an Al-magnesium (Mg) alloy or an Al—Mg-silicon (Si) alloy.

11. The method of claim 1, wherein the first filler metal comprises an Al—Mg alloy or an Al—Cu alloy.

12. The method of claim 11, wherein the Al—Mg alloy is a 5356 or 5556 alloy and the Al—Cu alloy is a 2319 alloy.

13. The method of claim 1, wherein the second filler metal comprises an Al—Si alloy, a commercially pure Al alloy, or an Al-manganese (Mn) alloy.

14. The method of claim 13, wherein the Al—Si alloy is a 4043 or 4943 alloy, the commercially pure Al alloy is a 1100 or 1188 alloy, and the Al—Mn alloy is a 3103 alloy.

15. The method of claim 1, wherein the fusion welding process comprises an arc welding process or a high energy beam welding process.

16. The method of claim 1, wherein the first weld is applied using a fusion welding process.

17. The method of claim 1, wherein the junction between the plurality of high-strength aluminum alloy structural members comprises at least one of a lap joint, a fillet joint, an edge joint, a corner joint, or a butt joint.

18. A method for improving corrosion resistance of a welded joint between a plurality of high-strength aluminum alloy structural members, comprising:

applying a first weld at a junction between the plurality of high-strength aluminum alloy structural members to join the plurality of high-strength aluminum alloy structural members, wherein the first weld is applied to each of the high-strength aluminum alloy structural members; and applying a second weld on at least a portion of a surface of the first weld using a filler metal, wherein the second weld contacts a surface of at least one of the high-strength aluminum alloy structural members and the portion of the surface of the first weld, and wherein the second weld is applied using a fusion welding process.

19. The method of claim 18, wherein the first weld is applied using a solid-state friction stir welding (FSW) process.

20. The method of claim 18, wherein the first weld is applied using a fusion welding process.

21. The method of claim 18, further comprising applying a plurality of second welds on at least respective portions of a surface of the first weld using the filler metal.

22. The method of claim 18, wherein the junction between the plurality of high-strength aluminum alloy structural members comprises at least one of a lap joint, a fillet joint, an edge joint, a corner joint, or a butt joint.

* * * * *